(12) United States Patent
Cheng

(10) Patent No.: US 7,867,543 B2
(45) Date of Patent: Jan. 11, 2011

(54) RICE BRAN FLOUR AND METHOD OF MAKING THEREOF

(75) Inventor: Hsing-Hsien Cheng, Taipei (TW)

(73) Assignee: Taipei Medical University, Taipei (TW)

( * ) Notice: Subject to any disclaimer, the term of this patent is extended or adjusted under 35 U.S.C. 154(b) by 1073 days.

(21) Appl. No.: 11/163,451

(22) Filed: Oct. 19, 2005

(65) Prior Publication Data

US 2007/0087097 A1  Apr. 19, 2007

(51) Int. Cl.
*A21D 2/00* (2006.01)
(52) U.S. Cl. .................. 426/622; 426/465; 426/483; 426/518; 426/520
(58) Field of Classification Search ............ 426/417, 426/44, 482, 520, 18, 615, 640, 481, 622, 426/465, 483, 518
See application file for complete search history.

(56) References Cited

U.S. PATENT DOCUMENTS

| | | | | |
|---|---|---|---|---|
| 2,653,100 A | * | 9/1953 | Carman et. al. | 426/621 |
| 5,179,890 A | * | 1/1993 | Reuveni et al. | 99/362 |
| 5,275,836 A | * | 1/1994 | Lewis et al. | 426/627 |
| 5,753,283 A | * | 5/1998 | Hammond | 426/44 |

FOREIGN PATENT DOCUMENTS

| JP | 2005-000049 A | | 1/2005 |
|---|---|---|---|
| WO | WO 01/21012 | * | 3/2001 |

OTHER PUBLICATIONS

Qureshi et al., "Effects of stabilized rice bran, its soluble and fiber fractions on blood glucose levels and serum lipid parameters in humans with diabetes mellitus Types I and II", Journal of Nutritional Biochemistry 13 (2002) 175-187, Elsevier Science Inc.

* cited by examiner

*Primary Examiner*—Drew E Becker
*Assistant Examiner*—Preston Smith
(74) *Attorney, Agent, or Firm*—McDonnell Boehnen Hulbert & Berghoff LLP

(57) ABSTRACT

This invention discloses a method for making rice bran flour by treating rice bran under high pressure and high temperature for a long period of time in two separate steps, the method comprising: husking and grinding the rice, then collecting the rice bran; inactivating the lipase of the rice bran; treating the rice bran under high pressure and high temperature; drying and screening the rice bran; treating the rice bran flour so obtained under high pressure and high temperature again; and cooling the rice bran. Said rice bran flour made from said method is effective in lowering glycosylated hemoglobin and increasing insulin of diabetes mellitus patients.

9 Claims, 4 Drawing Sheets

*, p < 0.05

RICE BRAN FLOUR AND METHOD OF MAKING THEREOF

BACKGROUND OF THE INVENTION

1. Field of the Invention

This invention relates generally to rice bran flour and the method of making the same, and more specifically it relates to a method of making rice bran flour which can effectively lower the glycosylated hemoglobin and increase the insulin of non-insulin dependent diabetes mellitus (NIDDM, Type II DM) patients.

2. Description of the Related Art

The present invention is directed to a method of making rice bran flour.

Gradually in recent years, much attention has been directed to the relationship between dietary fiber in foods and diabetes. Because dietary fiber can delay the digestion and absorption of foods, and improve the reaction of blood sugar and the concentration of insulin after meals, the incidence of diabetes can be reduced by increasing the ingested amount of whole-grain cereal and cereal fiber in the diet.

Rice bran is rich in dietary fiber, and it provides benefits in adjusting blood sugar of diabetes patients if the ingested amount of rice bran can be increased, e.g. via food processing. Junko in JPO patent publication number 2005-000049 discloses a method in which rice bran is heated by medium fire (60° C.) to turn it into brown rice bran, and then the brown rice bran is ground twice before it is to be eaten. This patent didn't teach inactivating the lipase which causes the rice bran to turn sour and rancid, therefore the quality of the rice bran product is compromised.

Qureshi A A et al., in 2002, JNB 13:175, heat the rice bran for 3 to 90 sec. at 130-140° C. in order to inactivate the lipase of rice brain to produce stabilized rice bran, then put the stabilized rice bran into water to be heated to 70-90° C., the rice bran is hydrolyzed by using carbohydrate hydrolases, then it is filtered to yield rice bran water solution (RBWS), and the insoluble substance is called rice bran fiber (RBF). An experiment is designed to have diabetes patients eat stabilized rice bran, RBWS, and RBF for 60 days. The result of the experiment is: after 60 days, the amount of serum insulin of the diabetes patients eating RBWS is increased by 4%, and the amount of the glycosylated hemoglobin of the diabetes patients is reduced by 15%. Therefore, it shows that eating RBWS can improve the effects of glycosylated hemoglobin and insulin of diabetes patients. However, the process for making RBWS is complicated, and it requires adding carbohydrate hydrolases to hydrolyze rice bran; moreover, the liquid form of RBWS is bound to limit its use in food manufacture.

Therefore, there is a need of providing a method whereby the user can easily manufacture a rice bran flour which is more useful in food manufacture and which can effectively lower the glycosylated hemoglobin and increase the insulin of diabetes patients.

SUMMARY OF THE INVENTION

The present invention advantageously fills the aforementioned need by providing a method for making rice bran flour.

The purpose of the present invention is to provide a method for making rice bran flour. More especially, it provides a method for making rice bran flour by subjecting rice bran to high pressure and high temperature for a long period of time in two separate steps.

Another purpose of the present invention is to provide the rice bran flour which is made by the above-mentioned method.

The method for making rice bran flour according to the present invention comprises the following steps:
(a) Husk and grind the rice, then collect the rice bran;
(b) Inactivate the lipase of the rice bran from step (a) by heating it at 70° C. for 4 hours;
(c) Treat the rice bran from step (b) in a device under high pressure at high temperature for 30-60 minutes;
(d) Dry the rice bran from step (c) in a drying apparatus;
(e) Screen the rice bran from step (d) using 28 mesh sieve to separate out rice bran flour;
(f) Treat the rice bran flour from step (e) in a device under high pressure and high temperature for 30-60 minutes again; and
(g) Cool the rice bran flour from step (f).

The rice bran flour made by the above-mentioned method is safe, low in contamination, and capable of effectively improving the effects of glycosylated hemoglobin and insulin of diabetes patients.

In said method for making rice bran flour, the raw material of the rice bran is preferably, but not limited to, Tainun No. 67.

The high-pressure, high-temperature device used in the present invention is selected from, but not limited to, the group consisting of double boilers, pasteurizing machines, and pressure cookers.

The present invention provides a method for mass producing rice bran flour which is safe, low in contamination, widely useful in food manufacture, and effective in improving the effects of glycosylated hemoglobin and insulin of diabetes patients. The rice bran flour made from the present invention method can be used as, but not limited to, nutriments, health foods, regular foods, etc.

The present invention now will be described more fully hereinafter with reference to the accompanying drawings, which are intended to be read in conjunction with both this summary, the detailed description and any preferred and/or particular embodiments specifically discussed.

BRIEF DESCRIPTION OF THE DRAWINGS

The present invention will become apparent upon reading of the following detailed description of the present invention in conjunction with the drawings, as follows.

DETAILED DESCRIPTION OF THE INVENTION

The present invention is directed to a method of making rice bran flour by subjecting rice bran to high pressure and high temperature for a long period of time in two separate steps, and to the rice bran flour made by such a method.

Figure 1:
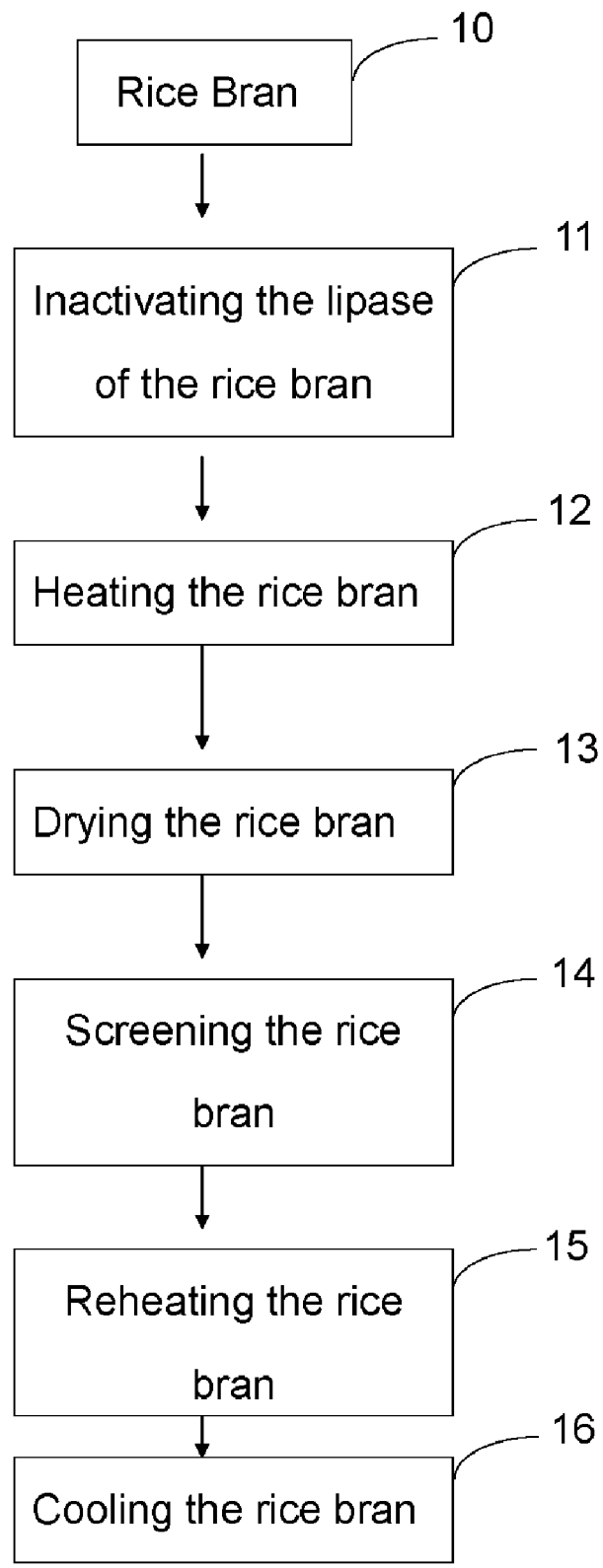
FIG. 1 is a block diagram of a method for making rice bran flour according to the present invention.

With reference to the FIG. 1, the steps of the method of the present invention are described in the following.

In Step 10, rice is husked and ground, then rice bran is collected.

In Step 11, the rice bran from step 10 is kept at 70° C. for 4 hours to inactivate the lipase of the rice bran. The device for inactivating the lipase of the rice bran of the present invention is selected from, but not limited to, the group consisting of double boilers, pasteurizing machines, and pressure cookers.

In Step 12, the rice bran from step 11 is heated in a device under high pressure and high temperature for 30-60 min. The device for heating said rice bran of the present invention is selected from, but not limited to, the group consisting of double boilers, pasteurizing machines, and pressure cookers.

In Step 13, the rice bran from step 12 is dried in a drying device. The device for drying said rice bran of the present invention is selected from, but not limited to, the group consisting of oven, blower, vacuum dryer, room- or low-temperature dryer and exsiccator.

In Step 14, the rice bran from step 13 is screened by using 28 mesh sieves to separate out rice bran flour.

In Step 15, the rice bran flour from step 14 is reheated in a high pressure, high-temperature device for 30-60 min. The device for heating said rice bran flour of the present invention is selected from, but not limited to, the group consisting of double boilers, pasteurizing machines, and pressure cookers. An embodiment of the present invention uses pasteurizing machines for reheating said rice bran flour.

In Step 16, the rice bran flour from step 15 is cooled.

The rice bran flour made from the present invention can be used as nutriments, health foods, regular foods, etc. However, its use is not limited to these applications.

EXAMPLE 1

Preparation of the Rice Bran

Tainun No. 67 rice is husked to collect the rice bran, then the lipase of the rice bran is inactivated at 70° C. for 4 hours within 24 hours after the rice bran is collected. After that, the rice bran is heated by a pasteurizing machine at 121° C. for 40 min, then dried using an oven set at 70-80° C. The rice bran is then screened with a stainless steel 28 mesh sieve, and the rice bran flour obtained is separately bagged in 20-grams bags, which are heated again in a pasteurizing machine at 121° C. for 40 min. Then the rice bran flour is cooled and stored at room temperature for later use.

EXAMPLE 2

Blood Sugar Concentration and Glycosylated Hemoglobin Test

In this example, tests are performed on 38 Type II diabetes mellitus patients (16 males and 22 females). The patients are randomly divided into 2 groups: the group using the rice bran flour made by the method of the present invention is called treatment group (T), and the group using commercial rice flour called placebo group (P). Within these two groups, those with $HbA_{1c}$<7.8 are called treatment low group (TL) and placebo low group (PL), respectively, and those with $HbA_{1c} \geq 7.8$ are called treatment high group (TH) and placebo high group (PH), respectively. Every patient in all groups takes 20 grams of rice bran or commercial rice flour per day.

The oral glucose tolerance test (OGTT) are performed at week 0, 4, 8, and 12 during the experiment. The blood sugar concentration and glycosylated hemoglobin ($HbA_{1c}$) are analyzed using commercial test kits (RANDOX Lab-Ltd., Britain). The area under the glucose curves (AUC glucose) is the blood sugar concentration multiplied by time. The blood sugar concentration and glycosylated hemoglobin of the patients of Example 2 are shown in Table 1.

TABLE 1

The blood sugar concentration and glycosylated hemoglobin of the patients during the experiment

| | week 0 | week 4 | week 8 | week 12 |
|---|---|---|---|---|
| Area under the glucose curves ($AUC_{glucose}$) ($10^3$mmol/L × min.) | | | | |
| TL | 2.27 ± 0.15 | 2.35 ± 0.15 | 2.27 ± 0.15 | 2.23 ± 0.10 |
| PL | 2.45 ± 0.18 | 2.48 ± 0.08 | 2.36 ± 0.05 | 2.44 ± 0.09 |
| TH | 3.06 ± 0.15$^A$ | 2.74 ± 0.13$^{AB}$ | 2.62 ± 0.18$^{AB}$ | 2.55 ± 0.16$^B$ |
| PH | 2.75 ± 0.31 | 2.68 ± 0.24 | 2.57 ± 0.23 | 2.69 ± 0.35 |
| Glycosylated Hemoglobin ($HbA_{1c}$) (%) | | | | |
| TL | 6.71 ± 0.15$^{ab}$ | 6.71 ± 0.16$^{ab}$ | 6.69 ± 0.16$^{ab}$ | 6.65 ± 0.14$^b$ |
| PL | 7.18 ± 0.22$^{ab}$ | 7.10 ± 0.23$^{ab}$ | 7.10 ± 0.20$^{ab}$ | 7.24 ± 0.22$^a$ |
| TH | 9.13 ± 0.29$^a$ | 8.65 ± 0.24$^{ab}$ | 8.10 ± 0.29$^b$ | 7.89 ± 0.36$^b$ |
| PH | 8.73 ± 0.40$^{ab}$ | 8.65 ± 0.22$^{ab}$ | 8.35 ± 0.23$^a$ | 8.33 ± 0.15$^a$ |

$^{A,B}$significantly different from 0-wk, p < 0.05.
$^{a,b}$significantly different from placebo group, p < 0.05.

Figure 2:
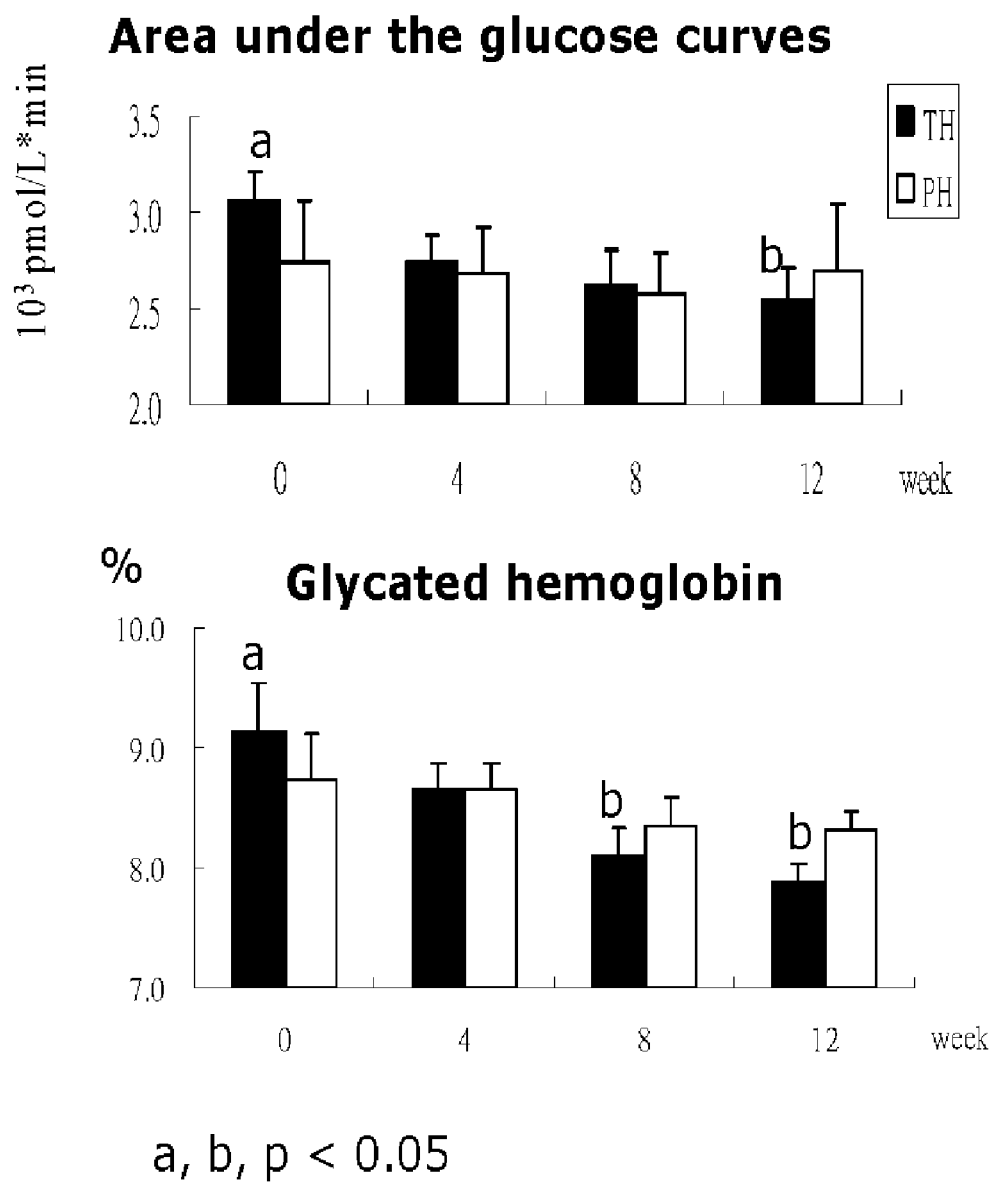
FIG. 2 is a bar graph showing the AUC glucose and the $HbA_{1c}$ during the experiment of the diabetes patients participating in the experiment.

FIG. 2 shows the change in the blood sugar concentration and glycosylated hemoglobin of the TH and PH groups. As shown in FIG. 2, the $HbA_{1c}$ % of TH is significantly lower than the $HbA_{1c}$ % of PH after week 8 into the experiment, and the AUC glucose of TH is significantly lower than the AUC glucose of PH after week 12 into the experiment. Therefore, the AUC glucose and the $HbA_{1c}$ % can be effectively reduced when the patients take 20 grams per day of the rice bran flour made from the method of the present invention.

EXAMPLE 3

Insulin Concentration Test

The 38 Type II diabetes mellitus patients (16 males and 22 females) are divided as in Example 2. The patients are randomly divided into 2 groups: the group using the rice bran flour made by the method of the present invention is called treatment group (T), and the group using commercial rice flour called placebo group (P). Within these two groups, those with $HbA_{1c}$<7.8 are called treatment low group (TL) and placebo low group (PL), respectively, and those with $HbA_{1c} \geq 7.8$ are called treatment high group (TH) and placebo high group (PH), respectively. Every patient in all groups takes 20 grams rice bran or commercial rice flour per day.

The oral glucose tolerance test (OGTT) are performed at week 0, 4, 8, and 12 during the experiment. The insulin concentration is analyzed using commercial test kits (RANDOX Lab-Ltd., Britain). The area under the insulin curves (AUC insulin) is the insulin concentration multiplied by time. The insulin concentration of the patients of Example 3 are shown in Table 2.

TABLE 2

The area under the insulin curves of the patients during the experiment

| | week 0 | week 4 | week 8 | week 12 |
|---|---|---|---|---|
| Area under the insulin curves (AUC insulin) ($10^4$pmol/L × min.) | | | | |
| TL | 3.12 ± 0.36 | 4.36 ± 0.85 | 3.85 ± 0.76 | 3.76 ± 0.54 |
| PL | 3.99 ± 0.86 | 3.77 ± 1.24 | 3.42 ± 0.55 | 3.34 ± 0.86 |
| TH | 3.34 ± 0.51$^{ab}$ | 4.09 ± 0.75$^{ab}$ | 4.19 ± 0.68$^a$ | 4.61 ± 1.00$^a$ |
| PH | 4.02 ± 1.01$^{ab}$ | 2.95 ± 0.30$^{ab}$ | 3.09 ± 0.60$^b$ | 2.73 ± 0.32$^b$ |

$^{a,b}$significantly different from placebo group, p < 0.05.

Figure 3:
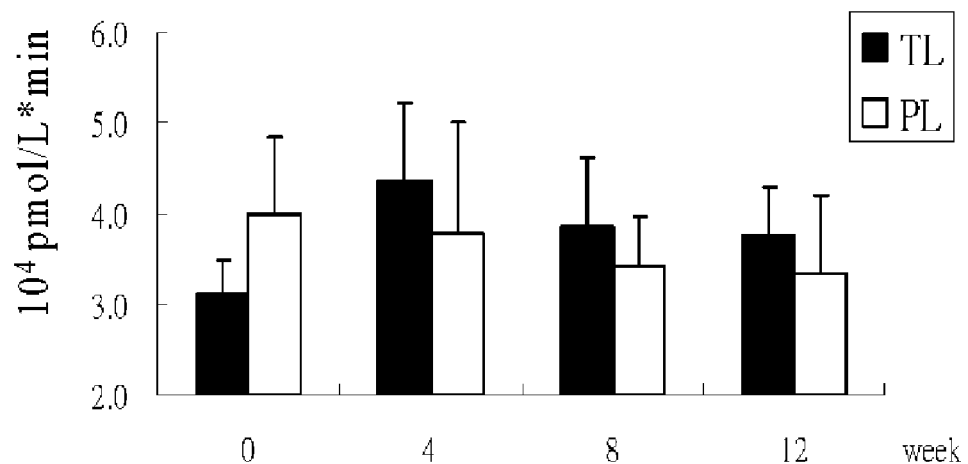
FIG. 3 is a bar graph of the $AUC_{insulin}$ during the experiment of the diabetes patients participating in the experiment.
Figure 3:
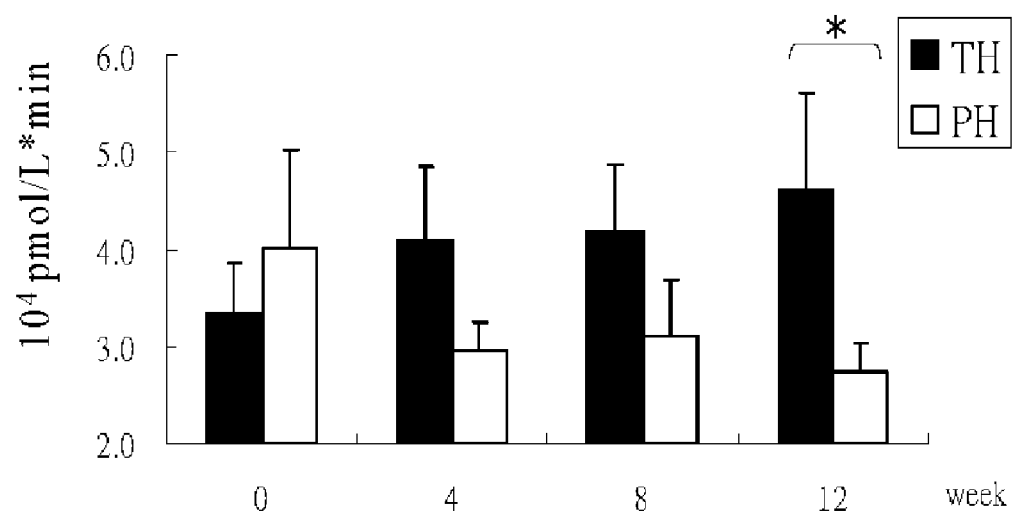

FIG. 3 shows the change in the area under the insulin curves ($AUC_{insulin}$) of the TH, PL, TH and PH groups. As shown in FIG. 3, the $AUC_{insulin}$ of TH is significantly higher than the $AUC_{insulin}$ of PH after week 8 into the experiment. Therefore, the $AUC_{insulin}$ can be effectively increased when the patients take 20 grams per day of the rice bran flour made from the method of the present invention.

EXAMPLE 4

Cholesterol and Triglyceride Concentration Test

The 38 type II diabetes mellitus patients (16 males and 22 females) are divided as in Example 2. The patients are randomly divided into 2 groups: the group using the rice bran flour made by the method of the present invention is called treatment group (T), and the group using commercial rice flour called placebo group (P). Within these two groups, those with $HbA_{1c} < 7.8$ are called treatment low group (TL) and placebo low group (PL), respectively, and those with $HbA_{1c} \geq 7.8$ are called treatment high group (TH) and placebo high group (PH), respectively. Every patient in all groups takes 20 grams of rice bran per day.

The total plasma cholesterol, low density lipoprotein (LDL) and triglyceride concentration test is performed at week 0, 4, 8, and 12 during the experiment. The LDL is separated from plasma lipoprotein by high speed centrifuge and then the total plasma cholesterol, LDL and plasma triglyceride concentrations are analyzed using commercial test kits (RANDOX Lab-Ltd., Britain).

Figure 4:
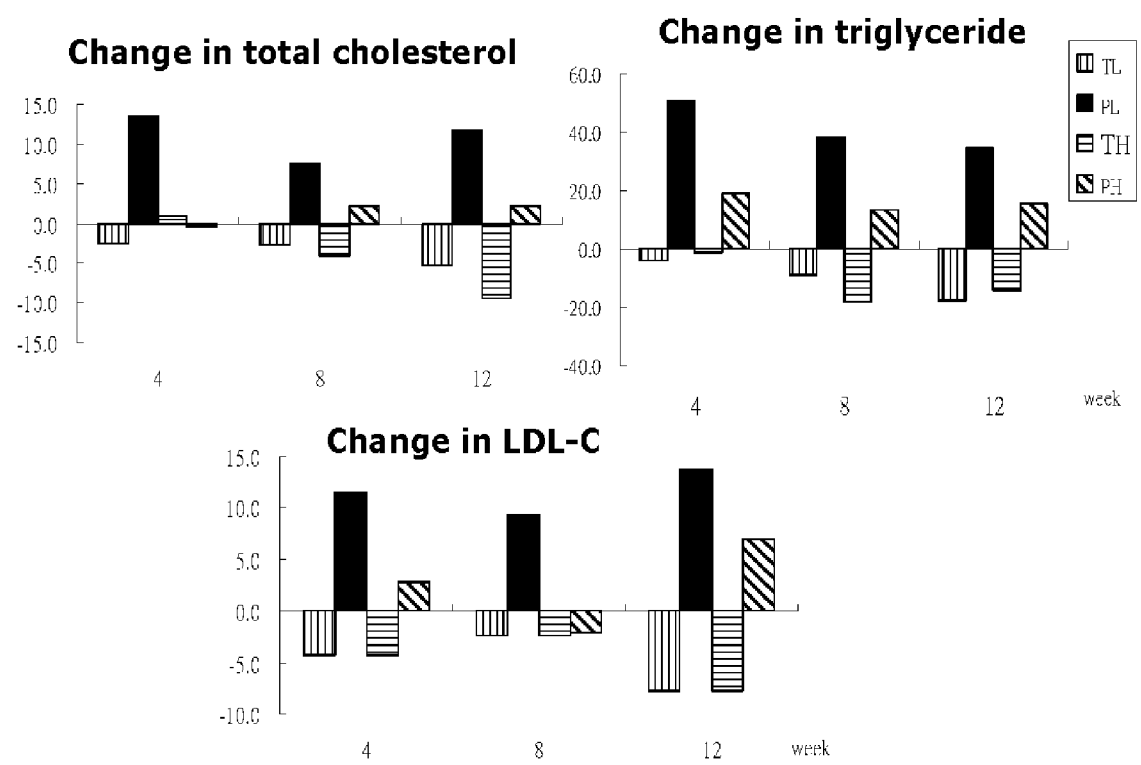
FIG. 4 is a bar graph of the triglyceride, total cholesterol, and LDL contents during the experiment of the diabetes patients participating in the experiment.

FIG. 4 shows the changes in total plasma cholesterol, LDL and plasma triglyceride concentrations analyzed at week 0, 4, 8, and 12 during the experiment. The plasma triglyceride concentration of TL and TH groups are significantly lower at week 4, 8, and 12 than at week 0; the total plasma cholesterol concentration of TL and TH groups are lower at week 4, 8, and 12 than at week 0. Therefore, the plasma triglyceride concentration can be effectively reduced when the patients take 20 grams per day of the rice bran flour made from the method of the present invention.

The experimental data using the rice bran flour made from the method of the present invention compared with prior art are shown in Table 3. The serum insulin concentration increases by 4% after prior art RBWS is taken for 60 days. In contrast, the serum insulin concentration increases by 10.7% after 20 g/day of the rice bran flour made from the method of the present invention is taken for 8 weeks (56 days). Namely, the increase by the rice bran flour is 6.7% higher than that of the prior art. In the case of $AUC_{insulin}$, it increases by 25.5% after the rice bran flour made from the method of the present invention is taken at 20 g/day for 8 weeks, and by 38% after the rice bran flour made from the method of the present invention is taken at the regimen of 20 g/day for 12 weeks. It shows that the rice bran flour made from the method of the present invention can increase the serum insulin concentration and the $AUC_{insulin}$ of Type II diabetes mellitus patients more effectively than the prior art products.

TABLE 3

The data using the rice bran flour made from the method of the present invention compared with prior art

| | Rice Bran (the present invention) | | SRB | RBWS | RBFC |
|---|---|---|---|---|---|
| | Week 8 | week 12 | | 60 days | |
| $HbA_{1c}$ | −11.3% | −13.6% | — | −15% | −11% |
| AUC glucose | −14.5% | −16.8% | — | — | — |
| Fasting blood sugar | −4.8% | −9.4% | — | −33% | −22% |
| Serum insulin | +10.7% | +10.4% | — | +4% | — |
| AUC insulin | +25.5% | +38.0% | — | — | — |

The safety analysis of the rice bran flour made from the method of the present invention is shown in Table 4. The contents of heavy metal (pb) in the rice bran of the present invention are lower than 0.2 ppm; as for the contents of microbe, no microbes are detected in the rice bran of the present invention; the water activity of the rice bran is in the range of 0.378-0.589 g/g.

TABLE 4

The safety analysis data of the rice bran flour made from the method of the present invention

| | Sample NO. | | | | |
|---|---|---|---|---|---|
| | 1 | 2 | 3 | 4 | 5 |
| Peroxide value | 12.26 | 13.52 | 13.98 | 12.28 | 9.17 |
| Free fatty acid (g/100 g) | 16.09 | 15.31 | 16.32 | 16.06 | 15.73 |
| Water activity(g/100 g) | 0.589 | 0.559 | 0.378 | 0.406 | 0.397 |
| Heavy metal (pb; ppm) | <0.2 | <0.2 | <0.2 | <0.2 | <0.2 |
| microbe(CFU/g) | — | — | — | — | — |
| Crude fiber(g/100 g) | 10.05 | 10.14 | 8.95 | 10.12 | 8.88 |
| Tocotrienols(mg/100 g) | 29.1 | 30.6 | 29.3 | 29.8 | 27.2 |

Compared with prior art, the method of the present invention for making rice bran flour is simpler. Notably, the method disclosed in the present invention can produce safer rice bran.

While the present invention has been described above in terms of specific embodiments, it is to be understood that the invention is not limited to these disclosed embodiments. Many modifications and other embodiments of the invention will come to mind of those skilled in the art to which this invention pertains; they are intended to be and are covered by both this disclosure and the appended claims. It is intended that the scope of the invention should be determined by proper interpretation and construction of the appended claims and their legal equivalents, as understood by those skilled in the art relying upon the disclosure in this specification and the attached drawings.

What is claimed is:

1. A method for making rice bran flour, comprising the steps of:
    (a) husking and grinding rice, then collecting the rice bran so generated;
    (b) inactivating the lipase of said rice bran from step (a) by heating at 70° C. for 4 hours;
    (c) treating said rice bran from step (b) in a device under a pressure and a high temperature of at least 121° C. for 30-60 minutes;
    (d) drying said rice bran from step (c) by a drying apparatus;

(e) screening said rice bran from step (d) using 28 mesh sieve to separate rice bran flour and bagging said rice bran flour;

(f) treating said rice bran flour from step (e) in a device under a pressure and a high temperature of at least 121° C. for 30-60 minutes; and (g) cooling said rice bran flour from step (f).

2. The method of claim 1, wherein said device in step (c) is a double boiler.

3. The method of claim 1, wherein said device in step (c) is a pasteurizing machine.

4. The method of claim 1, wherein said device in step (c) is a pressure cooker.

5. The method of claim 1, wherein said drying apparatus in step (d) is an oven.

6. The method of claim 1, wherein said drying apparatus in step (d) is a blower.

7. The method of claim 1, wherein said device in step (f) is a double boiler.

8. The method of claim 1, wherein said device in step (f) is a pasteurizing machine.

9. The method of claim 1, wherein said device in step (f) is a pressure cooker.

* * * * *